US006220065B1

(12) United States Patent
Lee

(10) Patent No.: US 6,220,065 B1
(45) Date of Patent: Apr. 24, 2001

(54) MECHANICAL PUSH BUTTON LOCK

(75) Inventor: Chariot Lee, Tao-Fen Chen (TW)

(73) Assignee: Mustek Systems, Ltd., Hsinchu (TW)

( * ) Notice: Subject to any disclaimer, the term of this patent is extended or adjusted under 35 U.S.C. 154(b) by 0 days.

(21) Appl. No.: 09/339,033

(22) Filed: Jun. 23, 1999

(51) Int. Cl.[7] .................................................... B60R 25/02
(52) U.S. Cl. .................... 70/214; 292/227; 292/DIG. 37
(58) Field of Search ............................. 70/DIG. 20, 214; 292/DIG. 37, 127, 227

(56) References Cited

U.S. PATENT DOCUMENTS 1,147,322 * 7/1915 Hampton .......................... 292/227 X
1,185,422 * 5/1916 Mammelli ............................ 292/227
1,253,545 * 1/1918 Tompkins et al. ............... 292/227 X
1,264,084 * 4/1918 Jungemann .......................... 292/227
1,556,524 * 10/1925 Kibble et al. .................... 292/227 X
2,003,731 * 6/1935 Beito ................................ 292/227 X
2,113,747 * 4/1938 Roedding et al. ............... 292/227 X
2,337,894 * 12/1943 Jacobi ................................. 292/227
2,545,645 * 3/1951 Blakely ............................ 292/227 X
3,044,287 * 7/1962 Pelcin ....................... 292/DIG. 37 X
3,090,643 * 5/1963 Barnes, Sr. ............... 292/DIG. 37 X
3,364,706 * 1/1968 Adam ............................... 292/227 X
4,208,837 * 6/1980 Black, Sr. et al. ........ 292/DIG. 37 X
4,223,940 * 9/1980 Janz et al. ................ 292/DIG. 37 X
5,570,915 * 11/1996 Asadurian ................ 292/DIG. 37 X
5,626,374 * 5/1997 Kim ......................... 292/DIG. 37 X
5,785,398 * 7/1998 Park ......................... 292/DIG. 37 X

* cited by examiner

*Primary Examiner*—Suzanne Dino Barrett
(74) *Attorney, Agent, or Firm*—Bacon & Thomas, PLLC

(57) ABSTRACT

A mechanical push button lock used to control locked/unlocked state of a specific element of a machine, such that when the mechanical push button lock is locked then the specific element also is locked. The proposed mechanical push button lock includes a push key, an actuating rod, a cross rod, a shaft and a spring. The push key is located in one end of the actuating rod, the actuating rod couples with the cross rod in another end of the actuating rod and the spring connects the actuating rod and the cross rod. Moreover, when the mechanical push button lock is locked then the cross rod contacts the specific element such that the specific element also is locked. Therefore, when the push key is pressed then the actuating rod slides until it contacts the cross rod. Afterwards, the cross rod is pushed by the actuating rod and rotates around the shaft. When the rotating angle is large enough then the cross rod does not contact the specific element and the specific element is unlocked.

15 Claims, 3 Drawing Sheets

MECHANICAL PUSH BUTTON LOCK

BACKGROUND OF THE INVENTION

1. Field of the Invention

The present invention relates to a mechanical push button lock for controlling a locked/unlocked state of a specific element of a machine, and more particularly to a mechanical push button lock that not only provides two stage tactile impression but also has simple structure and low manufacturing tolerance.

2. Description of the Prior Art

A mechanical push button lock is used to control the locked/unlocked state of a specific element of a machine and is in widespread use in conventional industry and many products. Possible applications include mechanical push button lock for the cover of a crystal display projector, the mechanical push button lock of door, and so on.

The conventional structure of the mechanical push button lock comprises two categories. One category provides two stage tactile impression and the other category provides a simple structure and low tolerance.

First category, as FIG. 1 shows, comprises push key 10, first cross rod 11, second cross rod 12, shaft 13, first spring 14 and second spring 15. Push key 10 located in one end of first cross rod 11, and one end of first spring 14 is located on first cross rod 11. Another end of first spring 14 is located on a fixed specific object 165 to settle first cross rod 11 in a specific region. Beside, the direction of first cross rod 11 points to second cross rod 12. Moreover, second cross rod 12 rotates around shaft 13 and second spring 15 is used to settle second cross rod 12 in another specific region by connecting second cross rod 12 with fixed specific object 16. Obviously, fixed specific object 16 and fixed specific object 165 can be the same object or be different objects, it depends on the design of mechanical push button lock. In addition, when the mechanical push button lock is locked then specific element17 also is restricted by second cross rod 12 and is locked.

Therefore, it is obvious that when push key 10 is pressed first cross rod 11 slight slides along the pressed direction and first spring 14 is transfigured. Afterwards, when first cross rod 11 touches second cross rod 12 then not only does first cross rod 11 slide along the pressed direction but also second cross rod 12 rotates around shaft 13. In other words, not only first spring 14 is transfigured but also second spring 15 is elongated. Then when second cross rod 12 rotates enough degrees, second cross rod 12 does not restrict specific element17 and then specific element 17 is unlocked.

Consequently, this category provides two stage tactile impression that is obvious to a user because the required pushed force is small before the first cross rod 11 contacts second cross rod 12 and is large after the first cross rod 11 contacts second cross rod 12.

The second category, as FIG. 2 shows, comprises push key 20, spring 21, shaft 22 and skeleton structure 23. Push key 20 is located in one end of skeleton structure 23 and specific element 24 contacts another end of skeleton structure 23 when specific element 24 is locked by the mechanical push button lock, and shaft 22 penetrates through skeleton structure 23. Moreover, spring 21 is used to settle skeleton structure 23 in a specific region by connecting skeleton structure 23 with fixed object 25.

Obviously, when push key 20 is pressed then skeleton structure 23 rotates around shaft 23, and when skeleton structure 23 rotates enough degrees then specific element 24 is relaxed and unlocked. Moreover, because only one spring 21 is transfigured, it provide a one stage tactile impression for user.

Comparing FIG. 1 and FIG. 2, it is crystal-clear that the structure of the first category is complicated and thus the cost of the first category is higher. In comparison, the structure of the second category is simplified and the cost of the second category is lower. Beside, the manufacturing process of the first category is more complicated for there are six component parts that need to be installed, but manufacturing tolerance is more sensitive in the second category because no spring is located between the push key and the shaft to absorb some manufacturing tolerance.

According to the previous discussion, it is obvious that both the conventional structures of the mechanical push button lock are required to improve, and it is therefore desired to develop a push button lock that provides two stage tactile impression, a simple structure and low manufacturing tolerances simultaneously.

SUMMARY OF THE INVENTION

The main objective of the present invention to mitigate and/or obviate these previously described disadvantages in the manner set forth in the following description of these preferred embodiments.

A primary object of the present invention is to present a mechanical push button lock that provides the user with a two stage tactile impression.

Another object of the present invention is to provide a mechanical push button lock that has a simple structure and a simple installation process.

A further object of the invention is to afford a mechanical push button that efficiently decreases the manufacturing tolerance.

These component parts of the provided invention comprise a push key, a shaft, a spring, a cross rod and an actuating rod. Moreover, these component parts are combined by the following rules:

(1) a cross rod is coupled with and actuating rod such that the cross rod is settled in a specific region.

(2) spring is used to connect the actuating rod and cross rod.

(3) a shaft penetrates through the cross rod.

(4) a push key is located in one end of actuating rod and a spring is located in another end of the actuating rod.

Further objectives and advantages of the present invention will become apparent as the following description proceeds, as well the features of novelty which is characterized in these claims annexed to and forming a part of the invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 3A illustrates the case that both the proposed mechanical push button and the specific elements also are locked; FIG. 3B illustrates the case that the proposed mechanical push button is pressed but the specific element is not relaxed; and FIG. 3C illustrates the case that both the proposed mechanical push button and the specific elements are unlocked.

DESCRIPTION OF THE PREFERRED EMBODIMENT

In order to elucidate these objects of the proposed mechanical push button lock that is used to control the locked/unlocked state of a specific element of a machine, some figures and some embodiments are employed to illustrate the invention and are explained in the following paragraphs.

Figure 1:
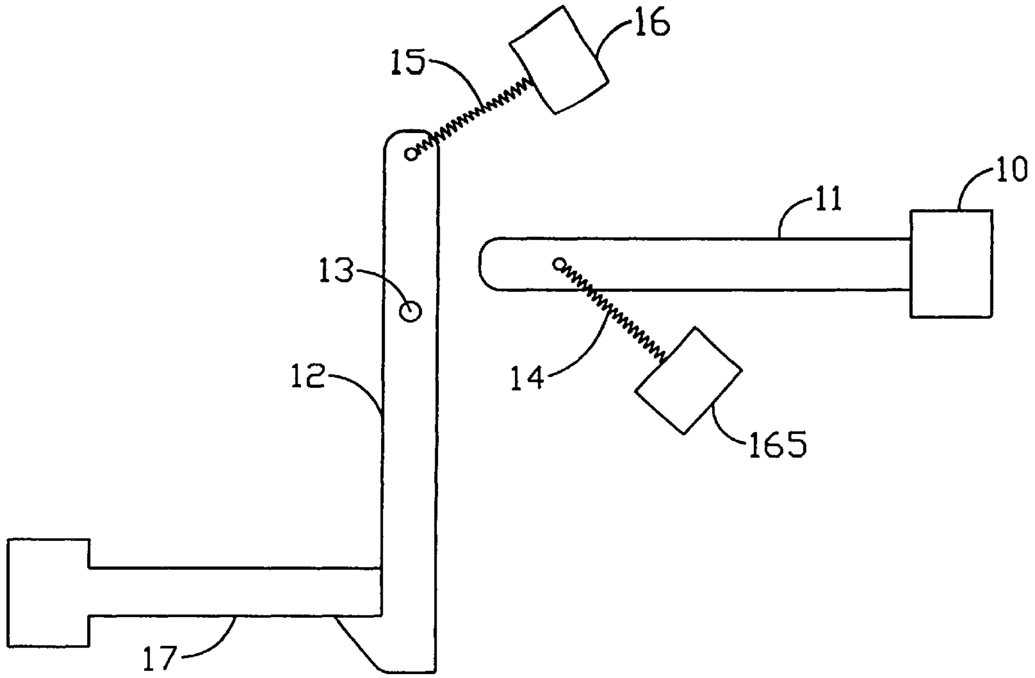
FIG.1(Prior Art)
FIG. 1 briefly illustrates the configuration of a conventional mechanical push button lock, and a relation between the conventional mechanical push button and a specific element of a machine.
Figure 2:
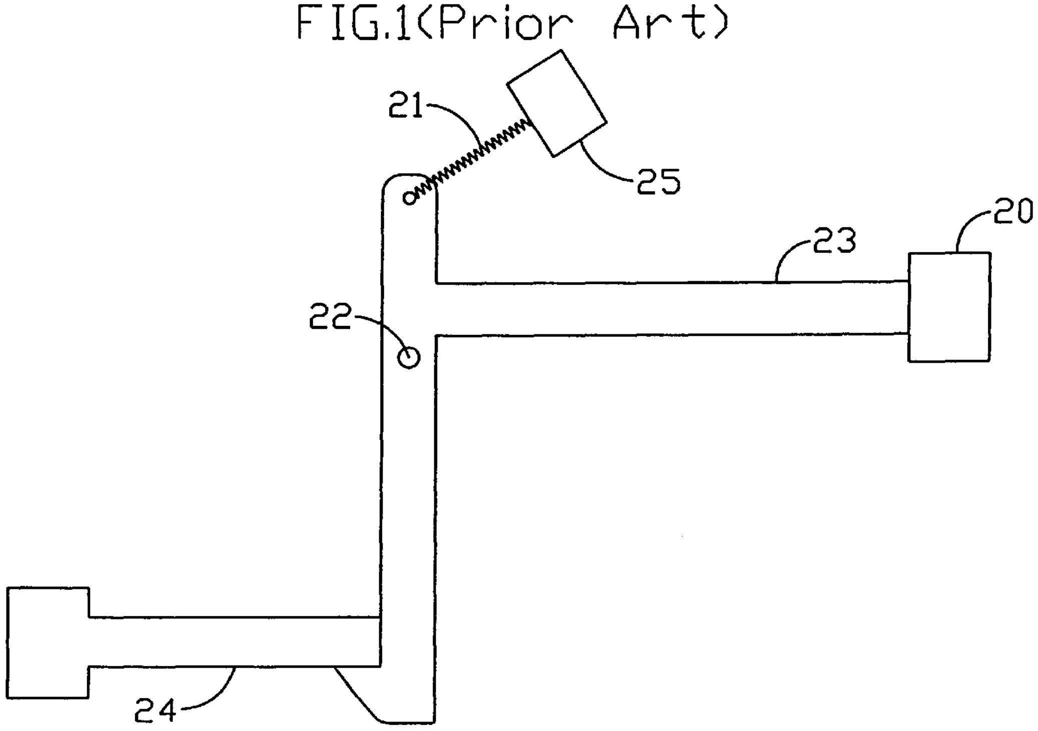
FIG.2(Prior Art)
FIG. 2 briefly illustrates the configuration of another conventional mechanical push button lock, and the relation between that conventional mechanical push button and a specific element of a machine.
Figure 3A:
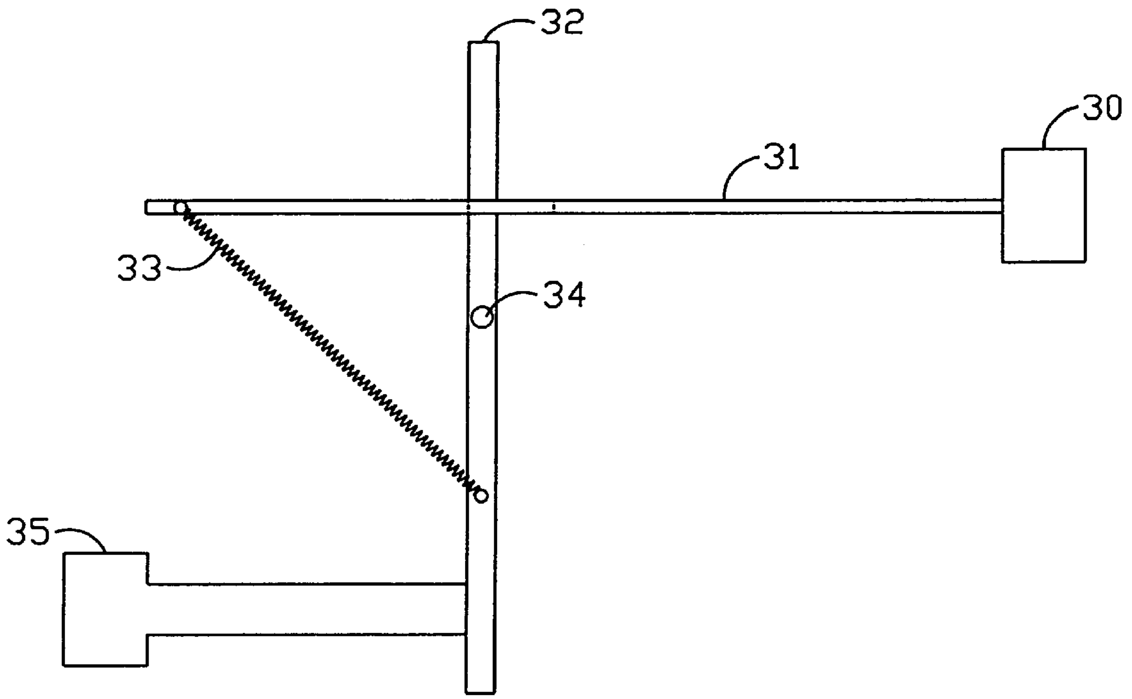
FIG. 3A to FIG. 3C are a series of schematic illustrations of the configuration of a proposed mechanical push button lock and the relation between the proposed mechanical push button and a specific element of a machine; where
Figure 3B:
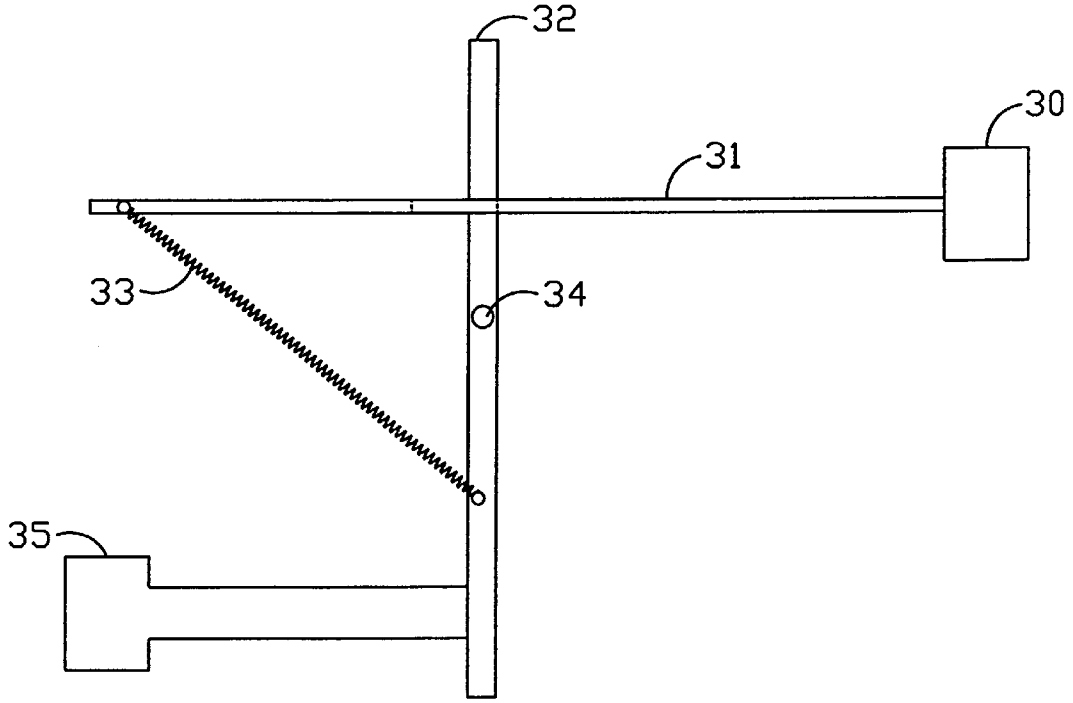
Figure 3C:
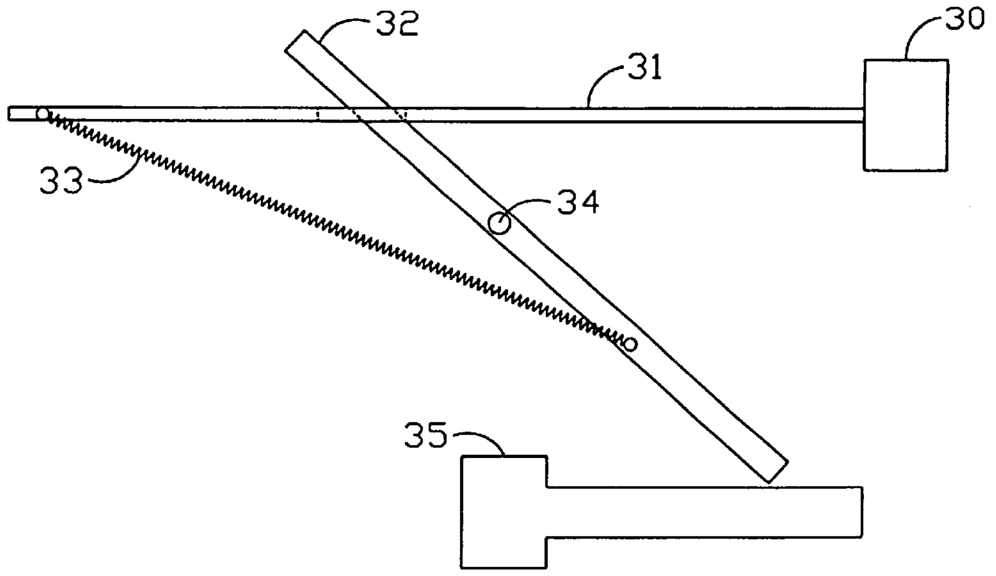

Referring to FIG. 3A to FIG. 3C, it is crystal-clear that the proposed mechanical push button lock comprises push key 30, actuating rod 31, cross rod 32, spring rod 33 and shaft 34. These component parts are combined by the following rules:

First rule: actuating rod 31 couples with cross rod 32 in one end of actuating rod 31. Where possible, the coupling between actuating rod 31 and cross rod 32 is achieved by extending cross rod 32 through a hole of actuating rod 31 and actuating rod 31 through another hole of cross rod 32. Herein, FIG. 3A to FIG. 3C illustrate the previous case.

Second rule: push key 30 is located in another end of actuating rod 31, where the shape of actuating rod 31 can be any shape. Beside, not only is push key 30 located in one end of actuating rod 31, but actuating rod 31 also extends through one hole of cross rod 32 in another end of actuating rod 31. No matter how, when actuating rod 31 extends through one hole of cross rod 32, the shape of the actuating rod 31 must as paddle-like shape and a bottle-like shape. In the case, diameter of the hole must be smaller than a width of the wide part of the paddle-like actuating rod 31.

Third rule: spring 33 connects actuating rod 31 and cross rod 32. Herein, spring 33 and push key 30 are located in opposite ends of actuating rod 31.

Fourth rule: shaft 34 penetrates through cross rod 32 such that cross rod 32 rotates around shaft 34.

Fifth rule: a location of spring 33 and specific element 35 must satisfy the requirement that the direction of a torque induced by spring 33 must be opposite to a direction of another torque induced by specific element 35 of a machine.

Sixth rule: when the mechanical push button locked is locked then specific element 35 contacts cross rod 32 such that specific element 35 is locked by the mechanical push button lock. Besides, the quantity of the torque that induced by spring 33 must be equal to the quantity of the torque that induced by specific element 35.

Obviously, because cross rod 32 is coupled with actuating rod 31, cross rod 32 is restricted in a specific region and it is not necessary to connect cross rod 32 with any specific object. In other words, the structure and manufacturing process of the invention is simpler than the first category of conventional mechanical push button lock.

FIG. 3A shows the case that the provided mechanical button lock does not pressed and be locked. Although there are two torques acting on cross rod 32, cross rod 32 does not rotate because the torque induced by spring 33 is totally offset by the torque induced by specific element 35. Therefore, specific element 35 is locked by the mechanical push button lock.

As FIG. 3B shows, when push key 30 is pressed, actuating rod 31 slides along the pushing direction and then spring 33 is elongated. Obviously, actuating rod 31 will continually slide until actuating rod 31 directly touches cross rod 32. No matter how, specific element 35 still is not relaxed because the location of cross rod 32 is not changed by pressing push key 31. Obviously, in the stage that FIG. 3B shows, the force that is applied to push key 30 only must be larger than opposite the direction components of elastic force of elongate spring 33.

No matter how, when press key 30 is continually pressed, not only is spring 33 elongated but also cross rod 32 is pushed and rotates around shaft 34, as FIG. 3C shows. Therefore, the force that applied in push key 30 not only needs to overcome opposite direction components of elastic force of elongated spring 33 that act on actuating rod 31, but also needs to overcome the torque induced by elongated spring 33 and acting on cross rod 32. Obviously, the required force in the stage is larger than the required force in the previous stage. In other words, the provided invention can provide a user with a two stage tactile impression.

Furthermore, because actuating rod 31 must directly push cross rod 32 before cross rod 32 rotates around shaft 34, it is obvious that both the sliding distance and sliding direction of actuating rod 31 are not restricted in a strict range. In other words, manufacturing tolerance of position of the both actuating rod 31 and push key 30 does not directly and sensitively affect the action of the provided mechanical push button lock.

Figure 4:
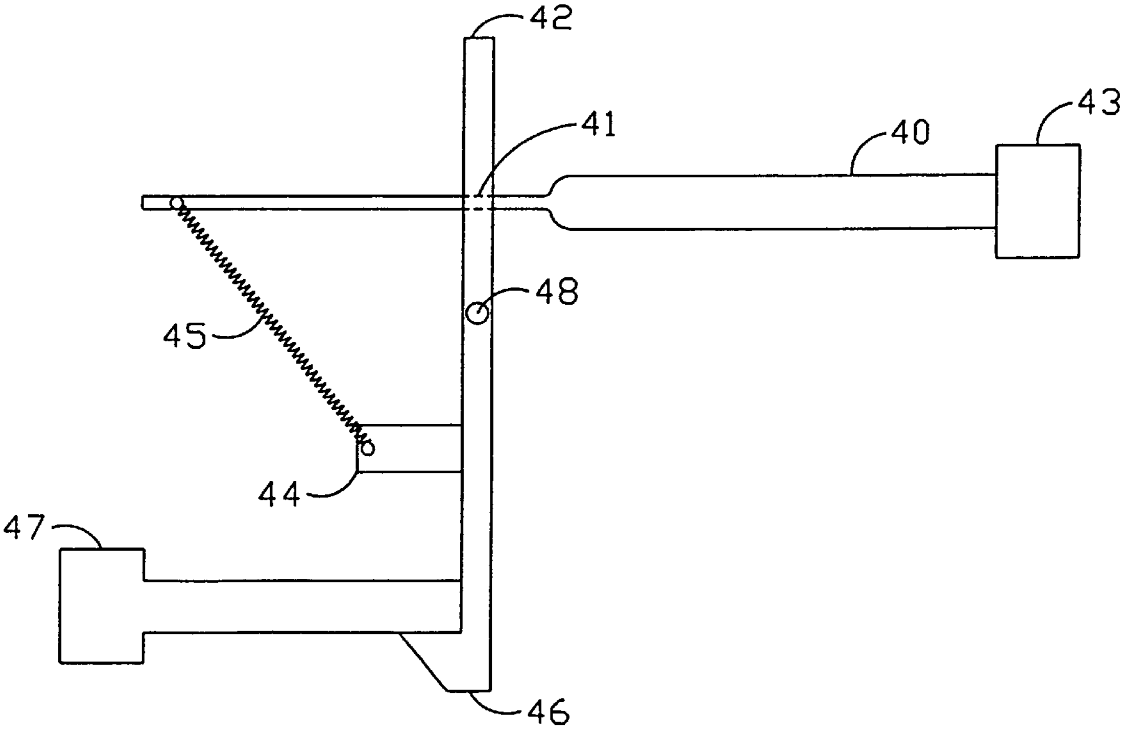
FIG. 4 is a briefly illustration about configuration of another proposed mechanical push button lock and relation between the proposed mechanical push button and a specific element of a machine, where the proposed mechanical push button is not be pressed and the specific element is locked.

FIG. 4 illustrates another possible structure of the proposed mechanical push button lock. Owing to the fact that the mechanism of the embodiment is equal to that of the previous embodiment, only the case that both the mechanical push button and the specific element are locked is illustrated.

To compare with the previous embodiment, the embodiment has some characteristics:

First, the shape of actuating rod 40 is paddle-like

Second, hole 41 locates in one end of cross rod 42 and paddle-like actuating rod 40 extends through hole 41 by the narrow end of paddle-like actuating rod 40.

Third, push key 43 is located in a wide end of paddle-like actuating rod 40.

Fourth, bulge 44 is located on cross rod 42 and spring 45 connects a tip of bulge 44 and the narrow end of paddle-like actuating rod 40.

Fifth, hook structure 46 is located in another end of cross rod 42 to secure specific element47.

In addition, owing to the fact that the mechanical push button lock is relaxed when cross rod 42 is pushed away by paddle-like actuating rod 40, when press key 43 is pressed and slides enough distance, cross rod 42 is pushed by paddle-like actuating rod 42 and rotates around shaft 48.

Moreover, owing to the fact that torque is the product of force and distance, it is better to increase the distance between shaft 46 and the join of spring 45 and cross 42 rod to provide a large torque and decrease the force that a user need to apply on push key 43.

A various possible embodiments may be made of the above invention without departing from the scope of the invention, it is to be understood that all matter herein described or shown in the accompanying drawings is to be interpreted as illustrate and not in a limiting sense. Thus, it will be appreciated that these drawings are exemplary of a preferred embodiments of this invention.

What is claimed is:

1. A mechanical push button lock for controlling a locked/unlocked state of a specific element of a machine, comprising:

a push key;

an actuating rod, wherein said push key is located in a first end of said actuating rod;

a cross rod, wherein a first end of said cross rod is coupled with a second end of said actuating rod;

a spring, wherein an end of said spring is located in a second end of said cross rod and wherein said spring is arranged such that said spring is deformed by elongation during operation of the mechanical push button lock to provide the user with a two-stage tactile impression upon operating the mechanical push button lock; and a shaft, wherein said shaft penetrates through said cross rod.

2. The mechanical push button lock according to claim 1, wherein the coupling between said actuating rod and said cross rod comprises extension of said cross rod through a second hole of said actuating rod.

3. The mechanical push button lock according to claim 1, wherein the coupling between said actuating rod and said cross rod comprises extension of said cross rod through a second hole of said actuating rod.

4. The mechanical push button lock according to claim 1, wherein a width of said first end of said actuating rod is larger than a diameter of said first hole.

5. The mechanical push button lock according to claim 1, wherein said cross rod rotates around said shaft.

6. The mechanical push button lock according to claim 1, wherein said specific element of said machine contacts said mechanical push button lock when said mechanical push button lock is locked.

7. The mechanical push button lock according to claim 1, wherein a direction of a first torque that is induced by said spring is opposite to a direction of a second torque that is induced by said specific element.

8. The mechanical push button lock according to claim 7, wherein the quantity of said first torque is equal to the quantity of said second torque when said mechanical push button is locked.

9. A mechanical push button lock for controlling a locked/unlocked state of a specific element of a machine, comprising:

a push key;

a paddle-like actuating rod, wherein said push key is located in a wide end of said paddle-like actuating rod;

a cross rod, wherein a first end of said cross rod is coupled with a narrow end of said paddle-like actuating rod, said cross rod having a hook structure in a second end;

a spring, wherein an end of said spring is located in said narrow end of said paddle-like actuating rod and another end of said spring is located in a tip of a bulge of said cross rod, and wherein said spring is arranged such that said spring is deformed by elongation during operation of the mechanical push button lock to provide the user with a two-stage tactile impression upon operating the mechanical push button lock; and a shaft, wherein said shaft penetrates through said cross rod such that said cross rod rotates around said shaft.

10. The mechanical push button lock according to claim 9, wherein said paddle-like actuating rod extends through a first hole of said cross rod.

11. The mechanical push button lock according to claim 9, wherein a width of said wide end of said paddle-like actuating rod is larger than a diameter of said first hole.

12. The mechanical push button lock according to claim 9, when said mechanical push button lock is locked the said specific element of said machine contacts said mechanical push button lock, where said specific element contacts said second end of said cross rod and is secured by said hook structure.

13. The mechanical push button lock according to claim 9, wherein a direction of a first torque that is induced by said spring is opposite to a direction of a second torque that is induced by said specific element.

14. The mechanical push button lock according to claim 13, wherein the quantity of said first torque is equal to the quantity of said second torque when said mechanical push button is locked.

15. A mechanical push button lock for controlling a locked/unlocked state of a specific element of a machine, comprising:

a push key;

an actuating rod, wherein said push key is located in a first end of said actuating rod;

a cross rod, wherein a first end of said cross rod is coupled with a second end of said actuating rod by extending said cross rod through a second hole of said actuating rod;

a spring, wherein an end of said spring is located in said actuating rod and another end of said spring is located in a second end of said cross rod; and a shaft. wherein said shaft penetrates through said cross rod.

* * * * *